United States Patent [19]
Rubio et al.

[11] Patent Number: 5,662,949
[45] Date of Patent: Sep. 2, 1997

[54] TORTILLA MANUFACTURING APPARATUS

[75] Inventors: Manuel Jesus Rubio, Miami, Fla.;
Ramiro Montelongo, Sector Guadalupe, Mexico

[73] Assignee: Roberto Gonzales Barrera, Lomas de Chapultepec Delegacio Miguel Hidalgo, Mexico

[21] Appl. No.: 669,110

[22] Filed: Jun. 24, 1996

Related U.S. Application Data

[62] Division of Ser. No. 377,213, Jan. 23, 1995, Pat. No. 5,569,220.

[51] Int. Cl.$^6$ ........................................ B26D 5/22
[52] U.S. Cl. ................... 425/310; 425/436 R; 426/496; 426/503; 426/512
[58] Field of Search ..................... 425/436, 436 RM, 425/310; 426/503, 496, 512

[56] References Cited

U.S. PATENT DOCUMENTS

| | | | |
|---|---|---|---|
| 1,724,827 | 8/1929 | Costello, Jr. | 425/436 |
| 2,130,887 | 10/1938 | Kremmling | 425/436 |
| 3,429,282 | 2/1969 | Ruiz | 425/310 |
| 3,971,481 | 7/1976 | Longenecker et al. | 214/6 H |
| 4,348,166 | 9/1982 | Fowler | 425/310 |

FOREIGN PATENT DOCUMENTS 0340383  11/1989  European Pat. Off. .

*Primary Examiner*—Jay H. Woo
*Assistant Examiner*—Iuric A. Schwartz
*Attorney, Agent, or Firm*—William G. Rhines, Esq.

[57] ABSTRACT

Embodiments of this invention, useful for removing articles cut from a sheet of flexible material include a gas transmissive conveyor belt that is brought into proximity to the exposed surface of the articles, a suction roll which backs the conveyor belt and has an internal vacuum and passageways for exposing said vacuum to the outer surface of the suction roll in configurations corresponding the leading portions of the articles, and means for causing the passageways to register substantially with the leading regions of the articles. Embodiments may also include passageways which are arcuately arrayed in groups, a cylindrical cutter roll for cutting out the articles from the sheet as it is being transported by a carrier surface, and/or a carrier surface in the form of a roll face.

2 Claims, 2 Drawing Sheets

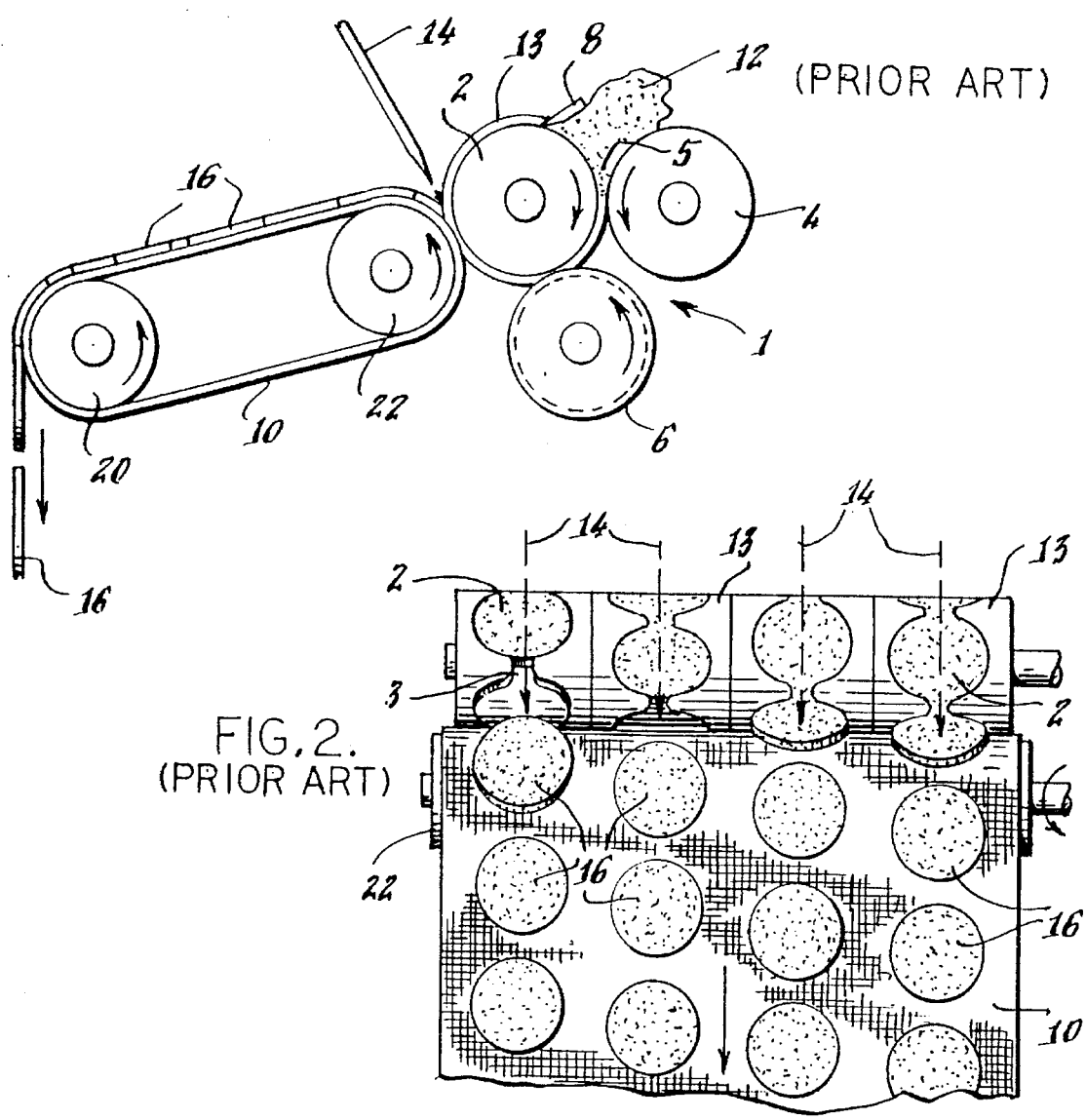
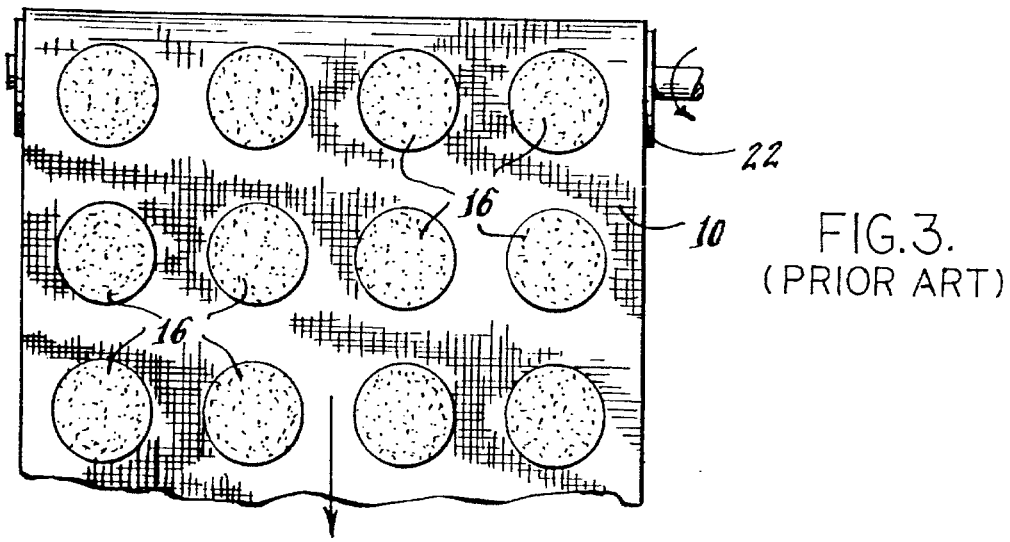

FIG.5.
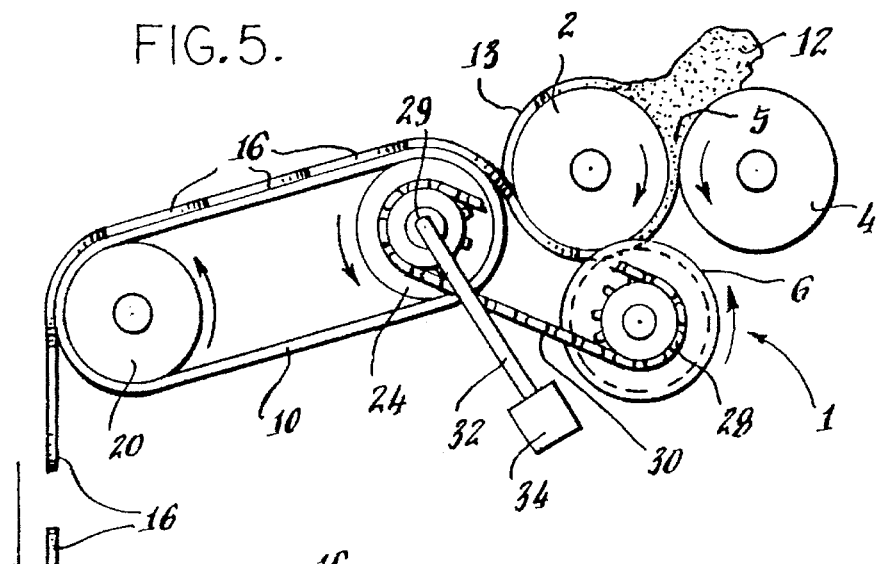
FIG.4.
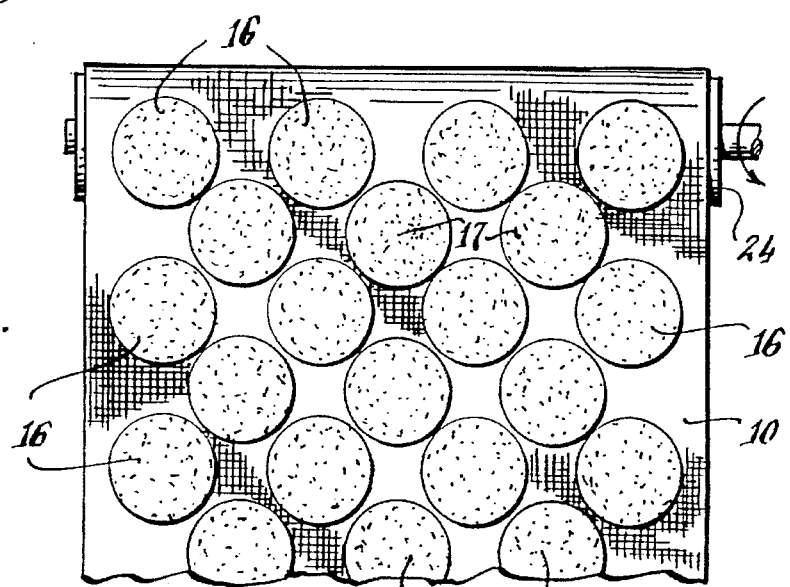
FIG 6
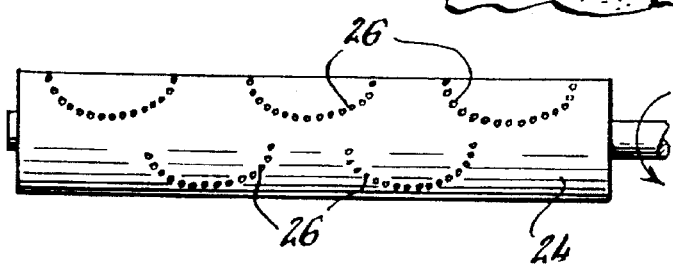
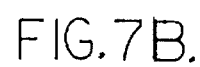
FIG.7A.
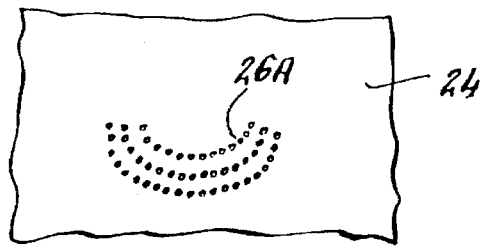
FIG.7B.
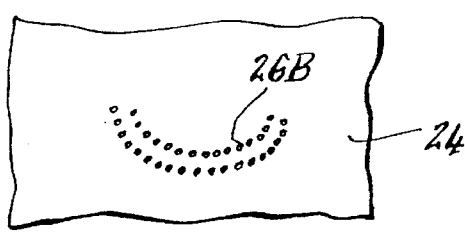

TORTILLA MANUFACTURING APPARATUS

This is a divisional application Ser. No. 08/377,213 filed on Jan. 23, 1995 U.S. Pat. No. 5,565,220.

BACKGROUND OF INVENTION

Frequently, it is desired to form amorphous masses of material into end products of predetermined and uniform shape and thickness, utilizing machinery which affords ease, speed and desirable economics. Thus, food products such as tortillas are formed from dough that has been made from corn flour in the shape of circles of substantially uniform thickness and diameter. Various methods and apparatus have been utilized for achieving these objectives. They include those in which desired shapes are die-cut from flat sheets of dough. In addition to hand operations, another approach to doing so is to use embossing or cutter rolls or cylindrical cutting dies. One type is disclosed in U.S. Pat. No. 4,413,973 to which, together with the references cited therein, reference is made. Other types include rolls which have circular cutting surfaces superimposed on their outer surface of the roll which serve, in the manner of cookie cutters, as die cutters by which tortillas are cut out from a juxtaposed sheet of corn flour dough. In general, although these various styles of cutter rolls differ somewhat from each other in structural details, they all are characterized by having an array of cutter surfaces positioned on the outer, peripheral surface of the cylindrical roll which act in concert with an associated roll or other moving surface to form a nip in which the cutter surfaces cut out desired product shapes from interposed material in sheet-like form while it is backed by the associated roll.

Typical prior art machinery embodying such technology is shown on the accompanying FIGS. 1 through 3. It includes a feed roll 4 and a carrier feed roll 2 which are abut are axially parallel, and rotate counter-directionally with respect to each other, and form a nip therebetween into which corn flour dough 12 is fed. As the dough moves through the nip, it is formed into a flat sheet which moves downward where it moves into the nip formed by the cutter roll 6 of one of the types hereinbefore described, and the carrier feed roll 2. In this case, the cylindrical outer surface of the cutter roll 6 has an orderly array of circular cutting ridges superimposed on it, and the rolls are so positioned with respect to each other that the tops of the cutting ridges or surfaces on the cylindrical, peripheral, outer surface of the cutter roll 6 come just into contact with the surface of the carrier feed roll 2. This causes the cutting ridges on the cutter roll 6 to penetrate substantially entirely through the sheet of dough after it has been transferred to the carrier feeder roll 2, thereby cutting out the tortillas from the sheet of dough in the manner of a "cookie cutter". The dough sheet and the tortillas which have been cut from it both continue to adhere lightly to the carrier feed roll 2 and to be carried along by it. A moving conveyor belt 10, synchronized to move at about the same linear rate of speed as does the outer surface of the carrier feed roll 2, is positioned so that it comes into close proximity with the surface of the dough sheet and the tortilla cut-outs without significantly compressing or otherwise marking the tortillas. The receiving surface of the conveyor belt may be made to travel slightly faster than the dough sheet so that the tortillas will be more actively removed from association with the remainder of the dough sheet. By these means, the belt 10 can receive the cut tortillas, laid out flat and in an orderly configuration with respect to each other, for transportation through ovens and to stacking mechanisms (not shown) of types known in the art, such as those disclosed in U.S. Pat. No. 3,971,481, to which reference is made.

The objective is for the cut-out tortillas to be transferred to the outer surface of the conveyor belt 10 by adhering to it sufficiently to cause the cut tortillas to become detached from the surface of the roll 2 while, at the same time, not causing the belt 10 to mark the surfaces of the tortillas objectionably or to adhere so tightly to them that subsequent removal of them from the belt without damaging them is made more difficult or impossible. Meanwhile, the remainder of the sheet of dough must follow the path of travel of the outer surface of the roll 2 in order to redeposit it subsequently into the mass of dough 12 being processed by the machine. To facilitate the continued adherence of the remainder of the dough sheet to the outer surface of the carrier roll 2, particularly where the roll is operated at such high speeds that centrifugal forces might tend to cause the dough to fly off, while, at the same time, not enhancing the adhesion of the tortillas to the roll surface, modifications typically are made in the carrier roll surface. Thus, the outer surface of the finished roll may be bombarded, in the manner of sand-blasting, with hard pellets, usually of metal. The effect is to pockmark the surface, thereby making it less adhesive and therefore less inhibiting of removal of the tortillas from it. However, the opposite result is desired with respect to the remainder of the dough sheet, where relatively high adhesion for continued retention is necessary. To achieve both of those divergent objectives simultaneously, circumferential, peripheral grooves are machined in the roll surfaces between the rows of tortillas. Into each of these grooves is placed an annular ring, the outside surface of which is very smooth to make it comparatively highly adhesive to the remainder of the dough sheet. Therefore, each such ring will retain the remaining "webs" of dough and keep them from coming off of the roll surface until they can be returned to the feed mound of dough. It should be noted here that this approach cannot be used in all configurations of tortillas. For it to work satisfactorily, the insert rings must be spaced from each other by more than the diameter of the tortillas so that the latter are not adhered to the roll along with the remainder of the dough sheet. Otherwise, the alternative to such ring installations of machining the required differing surfaces on the roll face is a very complex and costly task.

Another approach to overcoming the problem of transferring only the cut tortillas while all of the remainder of the dough sheet is carried away without any of it ending up as debris among the tortillas has been with the use of air jets. As shown in FIG. 2, such air jets 14 direct a stream of air between the front edge of each tortilla and the underlying outer surface of the carrier feed roll to which it is then loosely adhering. This causes that front edge of each tortilla to peel away from the roll 2. Thereafter, the continued interjection of air between the tortilla and the roll face, the action of gravity on the tortilla and/or the towing effect of the associated carrier belt as the tortilla comes into contact with it, causes the tortilla to peel away from the carrier feed roll 2 as it turns. In such arrangements, however, the air jets have the same effect on the webs of dough that remain between the successive tortilla cut-outs in a given row as they have on the cut-outs themselves. That is, the webs are caused to be lifted away from their loose adhesion to the outer surface of the carrier feed roll 2. Even so, the objective of removing the remaining dough without contaminating the tortillas may still be attained because the webs continue to be restrained by the continuity of the unsevered circumferential portions of the webs of dough holding them against being able to peel away from the outer surface of the roll. Thus, since the portions of web between the rows only become discontinuous along circumferentially oriented slots 3 between the tortillas in each row, as is also illustrated in FIG. 2 if the remaining circumferential web portions are of comparatively substantial width and thickness, they will be of sufficient mass to provide enough structural integrity to hold them together. However, if they do not, they will break apart and generate debris which falls into the tortillas.

By synchronizing the speed of the conveyor belt 10 with that of the roll 2, the tortillas may be positioned flat and in a substantially uniform configuration on the top surface of the conveyor belt 10. A typical such configuration of tortillas so produced and positioned is shown in FIG. 3. The rows of tortillas may be at an angle to the axis of the roll 2 so that the discharge of tortillas from the end of the belt will be staggered in order to avoid having four tortillas discharged from the end of the conveyor belt all at once as would be the case, for example, with the "straight-across" configuration shown in FIG. 3. However, even when the configuration of tortillas is thus varied, their density on the belt (i.e., the number of tortillas per unit surface area of the dough sheet and the conveyor belt) remains substantially unchanged.

So variously constructed, such existing prior art installations are commercially effective and in widespread use. However, there is interest in increasing the output of such installations without inducing other technical problems or having to replace, enlarge or otherwise substantially revamp the associated apparatus and/or physical environment in which they exist. One possibility for achieving that objective would be simply to add to the width of such machines. That option, however, for practical commercial or technical considerations, is unacceptable since it would require correspondingly widening the feed equipment, conveyor belts, ovens, stackers, etc. Further, it would also necessitate accommodating such other ancillary considerations as the heating capacity, capabilities and performance of ovens. In addition, widening of cutting and other rolls would make them more susceptible to mid-span deflection or bowing of their axes in the center regions. The resulting non-uniformity in thickness between the tortillas which come from the center of the rolls as compared with those which come their edge regions, unless expensive and technically difficult structural alterations are made in the rolls, is unacceptable and can be of substantial consequence. For example, if there is mid-span deflection of the center of the cutting roll, maintaining minimum thickness for the tortillas being formed in the edge rows may require as much as 4–5% overweight in the tortillas being formed at the center. For a machine processing tortillas at the typical rate of about 1 ton of dough per hour on a 24 hour per day schedule, the loss may come to as much as about 1.2 tons of dough per day.

A more desirable alternative to increasing machine output while avoiding having to lengthen the rolls and the correspondingly widen the associated equipment and to accommodate the other the aforementioned problems which are induced thereby, is to add to the number of tortilla cut-outs per unit area of dough sheet. To that end, it is proposed to modify the density and location of the cutting ridges on the cutter roll 6 so that, a cut-out pattern is used that modifies the basic pattern shown in FIG. 3. There the tortilla cut-outs 16 of each two adjacent columns (i.e., the arrays when viewed along the path of travel of the conveyor belt) are positioned side by side so that they form rows (i.e., the arrays when viewed across the conveyor belt, or in the direction of the axis of the carrier roll). The modification to be made to this pattern is shown in FIG. 4. There an additional column of tortilla cut-outs 17 is positioned between each adjacent pair of the previously described columns. Thus, a tortilla of each such newly added column is formed out of the space occupied by each interstitial web that is located between each group of four such tortilla cut-outs 16. The effect of such an addition is to increase materially the output capacity for the same machine width (roll length), while avoiding the difficulties of the type noted above. For example, on that basis, the number of tortillas per unit surface area of the portion of the dough sheet shown in FIG. 3 can, as is shown in FIG. 4, be increased from 12 to 21, or by about ¾. However, as is also apparent from FIG. 4, when that is done, several new considerations must be addressed. Either the dough remaining after the tortillas are removed ceases to be continuous or whatever webs of dough that do remain between the cut-outs become too narrow to be able to keep from falling apart if their loose adhesion to the carrier roll is disturbed. Further, means such as the circumferential groove-ring arrangement previously described become inapplicable. Therefore, in those circumstances, the web portions will not retain their continuity or their adhesion to the carrier roll, and pieces of the remaining dough will fall from the carrier roll face before controlled removal can be accomplished, thus contaminating the tortillas being produced.

Accordingly, it is an object of this invention to provide means for removing shaped cut-outs from a sheet of flexible material being carried on the outer surface of a roll.

Another object of this invention is to provide means for achieving the foregoing objective wherein the portions of the sheet remaining after removal of the cut-outs therefrom are lacking in sufficient structural integrity to be able to resist disintegration.

Yet another object of this invention is to provide means for achieving the foregoing objectives wherein the number of said shaped cut-outs per unit area of said sheet may be substantially increased.

STATEMENT OF INVENTION

Desired objectives may be achieved through practice of this invention, embodiments of which, useful in apparatus and methods for removing articles of desired peripheral configuration cut from a sheet of flexible material that is being transported by a carrier surface, include a gas transmissive conveyor belt that is adapted to come into proximity with the exposed surface of the articles while the belt is backed by a suction roll having an internal vacuum, which roll includes passageway means for exposing the vacuum to the outer surface of the suction roll in configurations corresponding substantially to the leading edge of each such article, and synchronization means for causing said passageway means to register substantially with the leading edges of each such article. Optionally, embodiments may include passageway means which are arcuately arrayed in groups, cutting means comprising a cylindrical cutting die which acts in concert with the carrier surface for causing the articles to be cut out from the sheet being transported it, and/or a carrier surface in the form of a roll face separation means for interrupting the adhesion of the articles from the carrier surface face.

DESCRIPTION OF DRAWINGS

This invention may be understood from the descriptions and claims which follow, and from the accompanying drawings in which FIG. 1 is a side view of prior art apparatus in this field, FIG. 2 is a front view of a portion of the prior art apparatus depicted in FIG. 1, FIG. 3 is a plan view of a portion of the prior art apparatus depicted in FIGS. 1 and 2, FIG. 4 is a plan view of apparatus embodying this invention, FIG. 5 is a side view of apparatus embodying this invention, FIG. 6 is a plan view of a suction roll embodying this invention, and FIGS. 7A and 7B are plan views of portions of suction rolls embodying this invention.

DESCRIPTION OF PREFERRED EMBODIMENTS

Reference having already been made to the prior art apparatus shown in FIGS. 1 through 3, attention is directed to the apparatus shown in FIG. 5, which embodies the present invention. There is depicted apparatus for making tortillas which includes a carrier feed roll 2 which, together with the feed roll 4, forms a nip 5 through which corn dough 12 passes as the rolls 2, 4 turn counterdirectionally in close proximity and at substantially the same speed with each other. This forms the dough into a sheet of substantially uniform thickness which extends substantially across the entire width of the apparatus (i.e., the length of the rolls 2, 4).

It is to be understood that by "substantially" as used herein is meant that although the condition or state of affairs to which that term refers is not or may not be literally totally so, any variance therefrom does not materially adversely affect the desired effect what would result but for that variance.

The sheet of dough, loosely adhering to the carrier feed roll 2 by which it is being supported and carried along, passes by the cutting roll 6. As it does so, circular cutting edges arrayed about the outer peripheral surface of the cutter roll 6 pass through the sheet of dough and come more or less into contact with the outer peripheral surface of the carrier feeder roll 2 which is traveling at substantially the same linear speed as does the peripheral surface of the cutter roll 6. The cutting edges thereby cut out the products being produced from the sheet to their desired peripheral edge shape and size. Since, in this example, those products are tortillas, that shape typically will be more or less circular and about 17.2 cm. or 6 ¾ inches in diameter. The tortillas that have been cut out from the sheet of dough and the remainder of the sheet, as yet unseparated from each other and loosely adhering to and therefore supported by the outer surface of the roll 2, continue along its path of travel. The exposed surfaces of the cut-outs and the remaining portions of the sheet are then brought just into very close proximity (e.g., about 0.32–0.64 cm. or ⅛–¼ inches) with the outer surface of the conveyor belt 10. As shown, the conveyor belt 10 is retentively, moveably positioned by means of a suction roll 24. This suction roll 24 may be about 12.2 cm. or 4.8 inches in diameter and about 48 cm. or 19 inches inches in length. Thereby, together, the dough sheet and the exposed surface of the conveyor belt create a closure in which the tortillas are not substantially compressed or otherwise substantially objectionably marked by the surface of the carrier belt but do come under the influence of the vacuum from the vacuum roll to which they are exposed as hereinafter described. As a result, the tortillas merely come into light surface contact with the conveyor belt 10. Typically, the conveyor belt 10 will be made from metal mesh or other material that is suitable to being formed into an endless belt and has the properties of being able to transmit vacuum through it (i.e., is pervious to gas) and of being tolerant of the thermal, chemical and physical environment to which it is to be exposed. Desirably, its exposed surface, being that of a wire mesh, provides some "catching" effect upon the surface of tortillas as they come into contact with it. This enables the belt surface to function as more than a mere receiving surface for the tortillas. It also provides sufficient purchase on the tortillas, short of defacing or otherwise damaging them, to actively "tow" each tortillas off of the carrier roll surface as hereinafter described.

The suction roll 24 is adapted to have an internal negative pressure or vacuum, and has arrays of passageways through its outer surface via which the internal vacuum is exposed to the outer surface of the roll, and then, via the pervious carrier belt 10, to the surface of the tortillas. One configuration for the pattern of holes 26 in the outer surface of the suction roll 24 is shown in FIG. 6. In general, it consists of groups of holes that are arrayed across the outer peripheral surface of the roll 24. They are so arranged that as the roll turns in proper positional and speed synchronization and registration of the arrays with respect to the cut-outs in the dough sheet, the arrays will present a group of holes to the leading edge (i.e., the edge first presented into proximity with the carrier belt) of each cut-out that is of substantially corresponding configuration, location and size to those of the cut-outs. In this embodiment, of course, the arrays are arcuate since that is the shape presented by the leading edge of the tortillas in the example being given. Such configurations, as shown in the embodiments of this invention illustrated in FIGS. 5 through 7B inclusive wherein the hole arrays 26A and 26B in FIGS. 7A and 7B respectively correspond positionally to the arrays 26 shown in FIG. 6, all of which, when translated to a flat planar surface, correspond to the columnar pattern shown in FIG. 4 with added rows of tortillas occupying the interstitial areas between adjacent, bracketing rows.

As shown in FIG. 5, the aforementioned synchronization and registration of the speed and position of the vacuum passage arrays with the leading edges of cut-outs (tortillas) as they are presented to the outer surface of the carrier belt may be achieved by interlinking the vacuum roll 24 speed and position with that of the cutter roll 6 and therefore of the cutting edges positioned on the peripheral surface thereof. As illustrated in FIG. 5, this is achieved by interconnecting a sprocket 28 affixed to the cutter roll 6 and a sprocket 29 affixed to the suction roll 24 by means of a chain 30. Thereby the arcuate arrays of suction holes 26 on the peripheral outer surface of the suction roll 24 may be made to register substantially with the leading edge of each of the cut products (e.g., tortillas) on the opposite side of the conveyor belt 10 therefrom as they come into juxtaposition. Then vacuum from a vacuum source 34 transmitted by a vacuum pipe 32 to the interior of the suction roll 24 will cause the leading edge of each cut tortilla to be peeled away from the carrier feed roll 2 to which it is loosely adhering. This result may be enhanced, and the likelihood of tortillas embedding objectionably in the conveyor belt 10 further avoided, by means of a strong wire (not shown), such as piano wire, being strung across the width of the machine, more or less parallel to the axis of and in contact with the outer surface of the roll 2. This has the effect of breaking whatever adhesion exists between each tortilla and the outer surface of the roll 2 so that the tortillas can peel away from that surface by the influence of the applied vacuum and/or gravity top edge first, and land on the top surface of the belt 10. Meanwhile, the remainder of the sheet of dough may be trained to follow the path of travel of the outer surface of the roll 2, for subsequent redeposit into the mass of dough 12 being processed by the machine. The removal of this "scrap" may also optionally be augmented by the installation of a similar wire apparatus (not shown) positioned parallel to the axis of and in contact with the surface of the carrier roll in the region of the dough mass 12.

The suction so applied to each tortilla will continue until the conveyor belt 10 reaches the top of the suction roll and begins to move tangentially with respect to its peripheral surface, thus interrupting the transmission of vacuum from the vacuum roll through the conveyor belt. However, by then, the effect of gravity and/or loose adhesion to the top surface of the conveyor belt 10 will have caused the tortilla to be peeled away entirely from the surface of the carrier feed roll 2, and to lay out flat in a controlled, desired distribution configuration with respect to the other tortillas, for conveyance away to ovens, stacking devices, packagers, or other apparatus as desired. This peeling or towing action by the conveyor belt may be enhanced by causing the carrier belt to move at a slightly faster rate than the dough sheet, as hereinbefore described. These approaches render it unnecessary for the surface of the carrier roll to be specially machined to provide a differential in adhesion as between the tortilla sites and the rest of the dough sheet as hereinbefore described. They make it possible to add columns of cut-outs (e.g., tortillas) which overlap adjacent cut-out columns so as to increase the density of articles being produced since such structures as the ring inserts previously described need not be resorted to. While the tortillas can thus effectively be removed in increased amounts, at the same time, the webs and strips of dough which remain on the surface of the carrier feed roll 2 after the tortillas have been disassociated from them will continue to adhere loosely to that surface. This is true even where a separating wire of the type hereinbefore described is used, since the vacuum supplied by the suction roll does not become applied to the "scrap" portion of the dough sheet, and it is free, therefore, to resume its interfacial contact with the roll face and the retaining adhesion inherent thereto. There the "scrap" portion of the dough sheet they may be carried off by the carrier roll 2 as it continues to turn, until it is recycled back into the mass of dough 12 as may be desired.

It will be apparent from the foregoing description and the accompanying drawings that this invention may be practiced with a wide variety of variants from the exact structures shown and described. For example, the carrier roll as described may be in any of a number of other forms, such as a belt-like element. The cutter means may be in a form other than a cutter roll, such as individually or group actuated piston-actuated cutting dies. The synchronization means may be other than the chain and sprocket arrangement shown, such as electronic monitors and actuators. It will also be apparent that through practice of this invention it is possible to improve greatly on the efficiency and costs of making products such as the tortillas described. With it, using existing equipment that is modified substantially only as is necessary to accommodate the invention itself, it is possible to increase substantially the production of such articles. Thus, as shown, the production of existing tortilla production machinery may be increased by substantial percentages without having to lengthen any of the constituent rolls, or widen any of the production or associated machinery, including the ovens. Other adjustments, such as increasing the amount of heat in the ovens to accommodate the comparatively small increase in the volume of dough presented for cooking, are minor and are easily handled. These benefits, in addition, are achieved without inducing such adverse secondary consequences as roll deflection, with its associated waste of dough materials being used.

Thus, it is to be understood the embodiments of this invention that have been described and illustrated are by way of illustration and not of limitation, and that a wide variety of embodiments may be made without departing from the spirit or scope of this invention.

We claim:

1. Apparatus for separating and removing articles of desired peripheral configuration and dimensions from a sheet of flexible material out of which they have been cut comprising a gas transmissive conveyor belt that is backed by a suction roll which is adapted to back said conveyor belt and movingly retain said conveyor belt in proximity to the exposed surface of a moving sheet of flexible material from which articles of desired dimensions and configurations have been cut, said suction roll being adapted for having an internal vacuum and including passageway means which expose said vacuum to the outer surface of said suction roll in the region where said suction roll movingly retains said conveyor belt in proximity to said sheet, and are in configurations substantially corresponding in dimension and shape to the leading portion of each of said articles, and synchronization means for causing said passageway means to register with the leading portion of articles which have been cut but not yet removed from said sheet.

2. The apparatus described in claim 1 wherein with said passageways are arcuately arrayed groups which correspond in dimension and shape to the leading portion of said articles.

* * * * *